United States Patent [19]
Kalkman et al.

[11] Patent Number: 6,024,184
[45] Date of Patent: Feb. 15, 2000

[54] TRANSPORT VEHICLE FOR LARGE, HEAVY LOADS

[75] Inventors: Piet Kalkman, Waddinxveen; Joop Roodenburg, Delft, both of Netherlands

[73] Assignee: Itrec B.V., Rotterdam, Netherlands

[21] Appl. No.: 09/020,909

[22] Filed: Feb. 9, 1998

[30] Foreign Application Priority Data

Feb. 14, 1997 [NL] Netherlands ............................ 1005284

[51] Int. Cl.$^7$ ....................................................... B60D 7/14
[52] U.S. Cl. ............................................. 180/14.1; 180/22
[58] Field of Search ................................ 180/14.1, 14.2, 180/22, 23, 24, 264, 14.3; 105/3, 4.1, 4.2, 404; 280/781, 783, 785, 124.128, 789, 456.1, 107, 790, 797, 81.1, 81.6, 404, 656; 414/460; 212/344

[56] References Cited

U.S. PATENT DOCUMENTS

| | | |
|---|---|---|
| 2,919,928 | 1/1960 | Hoffer . |
| 2,981,548 | 4/1961 | Taylor . |
| 3,280,931 | 10/1966 | Cahill et al. . |
| 3,395,672 | 8/1968 | Ruf . |
| 3,807,752 | 4/1974 | Mauck . |
| 3,865,206 | 2/1975 | Coval . |
| 4,050,707 | 9/1977 | Glumac . |
| 4,163,578 | 8/1979 | Watson . |
| 4,185,710 | 1/1980 | Kronogård . |
| 4,262,923 | 4/1981 | Weir . |
| 4,269,560 | 5/1981 | Thomas . |
| 4,350,190 | 9/1982 | McColl . |
| 4,441,730 | 4/1984 | Damm . |
| 4,454,925 | 6/1984 | Oswald et al. ............................. 180/22 |
| 4,505,347 | 3/1985 | Prechtel ................................. 180/14.2 |
| 4,752,080 | 6/1988 | Rogers .................................... 280/426 |
| 4,982,976 | 1/1991 | Kramer .................................... 280/426 |
| 5,454,597 | 10/1995 | Thomas et al. ........................ 280/789 |

*Primary Examiner*—Douglas C. Butler
*Attorney, Agent, or Firm*—Young & Thompson

[57] ABSTRACT

A transport vehicle for large, heavy loads includes a number of modules coupled one behind the other, each with a loading platform which can be moved by sets of wheels and a drive for conveying the transport vehicle. The width of the modules corresponds to half the width of an ISO container (approx. 1215 mm) and the modules can also be coupled next to one another. This has the considerable advantage that the maximum track width is no longer limited by the width of the modules. As a result, the transport vehicle for large, heavy loads can be given any desired width without the modules becoming too large to handle.

6 Claims, 1 Drawing Sheet

U.S. Patent     Feb. 15, 2000     6,024,184
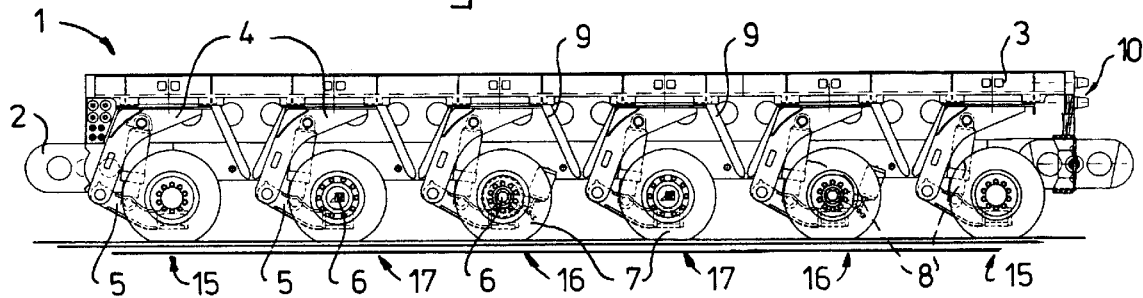
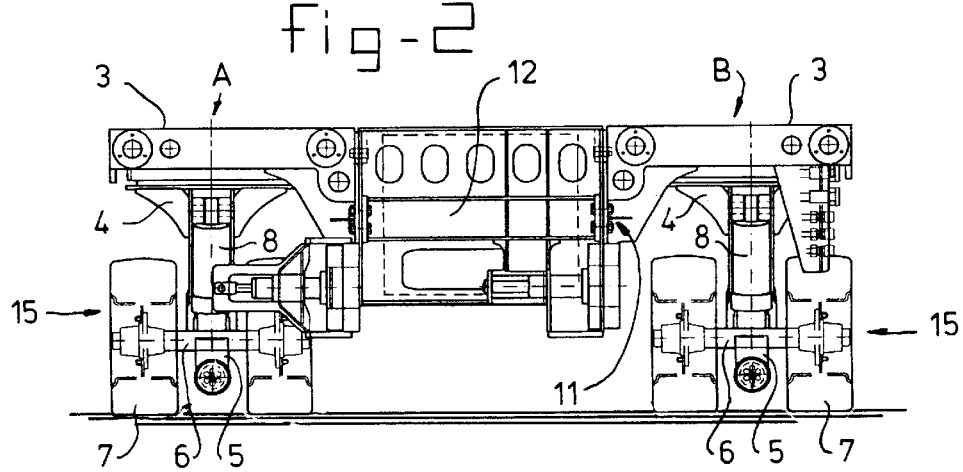
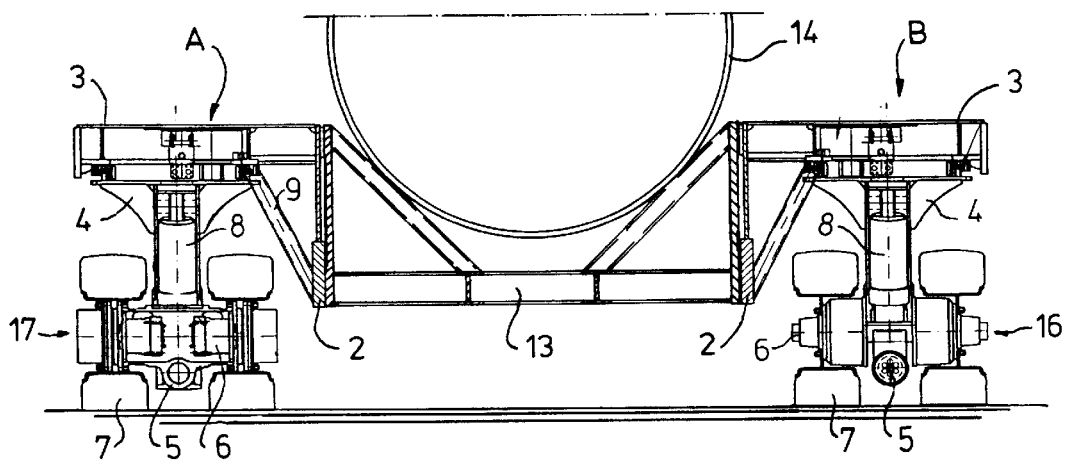

TRANSPORT VEHICLE FOR LARGE, HEAVY LOADS

The invention relates to a transport vehicle for large, heavy loads, comprising a number of modules coupled one behind the other, each with a loading platform which can be moved by means of sets of wheels and drive means for conveying the transport vehicle.

Transport vehicles for large, heavy loads are generally known from the prior art. A transport vehicle of this kind is composed of a number of modules. The modules can be coupled in the longitudinal direction in order to obtain the desired vehicle length. The modules themselves are composed of a loading platform, with a large number of axles and wheels beneath it in order to support the load over a large road surface. In order still to be able to maneuver a laden vehicle, in principle all the wheels can be used for steering. In this case, the wheels are not attached to rigid wide axles, but rather there are usually two short axles aligned across the width of the vehicle, with two wheels on each axle. The wheels are generally connected to the loading platform in such a way that the loading platform can be moved in the vertical direction with respect to the wheels.

The transport vehicles for large, heavy loads are generally provided with a power generator/converter. This is frequently a diesel engine which is coupled to a hydraulic pump. The power generator/converter is also referred to as the "power pack". The power pack enables the transport vehicle to be moved onwards. To this end, the hydraulic pump drives the hydraulic engines situated at the wheels. Moreover, the power pack provides the power for steering the transport vehicle and for adjusting the height of the loading platform of the transport vehicle. Since the power pack forms a component of the transport vehicle, the vehicles are also known as "self-propelled modular transporter" or "self-propelled modular trailer".

Transport vehicles for large, heavy loads according to the prior art are normally brought to the location where they are to be used with the aid of another vehicle. On land, the transport generally takes place using a semi-trailer, or if desired in a container. For transmarine transportation, the transport vehicles for large, heavy loads are generally conveyed in a container or instead of a container. If the transport vehicles are not conveyed in or instead of a container, their transport costs are relatively high. For this reason, the maximum dimensions of the transport vehicles for large, heavy loads are generally adapted to the standard ISO dimensions of containers. The width of the transport vehicles for large, heavy loads according to the prior art is therefore generally about 2430 mm.

A significant drawback of the transport vehicles for large, heavy loads according to the prior art is that the transport vehicles have a fixed track width. This means that it must be possible to convey both relatively heavy and small objects and relatively large and light objects in a stable manner on the same track width. When designing transport vehicles, the maximum track width is dependent on the width of the vehicle module. This may mean that objects which with regard to their weight fit very well on a specific transport vehicle cannot be conveyed using the transport vehicle owing to stability problems. In the case of objects which can be conveyed on a specific transport vehicle, stability problems limit the maximum speed of travel.

If the modules of a transport vehicle for large, heavy loads according to the prior art were to be coupled to one another widthways, the immediate result is a vehicle which is unmanageably wide, at a width of approximately 5 m. In order to be able to drive such a vehicle, it is necessary to resolve a number of infrastructure problems. It is not permitted to drive freight with a width of 5 m along every road. This frequently means that the freight can only be conveyed to the final destination via detours and complex routes. Even if the road does allow such transportation, there is a high probability that the road will have to be closed at least to other traffic.

The object of the present invention is to provide a transport vehicle for large, heavy loads, whose width is adapted to the dimension of an ISO container (about 2430 mm) and which can be widened without producing a vehicle of unmanageable width.

This object is achieved by the fact that the modules, the width of which corresponds to half the width of an ISO container (approx. 1215 mm), can also be coupled next to one another. This has the considerable advantage that the modules can be used to construct a transport vehicle for large, heavy loads which has a width of approximately 2430 mm and, if desired, to split the transport vehicle in the longitudinal direction and make it wider without necessarily producing a vehicle which has a width of twice the dimension of an ISO container, namely approximately 4866 mm. The transport vehicle according to the present invention can be made wider, for example, with the aid of coupling elements. Moreover, two modules which can be coupled to one another in the width direction can using this measure be transported in a container which is in accordance with the ISO Standard. The modules can thus easily be transported in a container or instead of a container. This makes transportation of the modules relatively inexpensive.

It is advantageous to design the modules in such a way that a module comprises fastening points on at least one side, in order to couple two modules arranged next to one another. This has the advantage that the modules can easily be coupled to one another without impairing the load-bearing capacity or the stability of the vehicles during coupling. Moreover, the fastening points can be used to fasten any coupling elements which can be placed between two modules.

Owing to the use of the transport vehicles, it is usually impossible, in design terms, for the wheels to protrude above the loading platform of the transport vehicle. This means that the minimum height of the transport vehicles for large, heavy loads according to the prior art is at least the sum of the wheel dimension and the thickness of the loading platform. This is a serious limitation when conveying relatively large objects. Objects whose dimensions would only just be able to pass through obstacles, such as bridges and tunnels, can no longer pass through these obstacles on a transport vehicle as a result of the fixed height of the loading platform. It is therefore sought to be able to couple two modules arranged next to one another at a certain distance apart. This is achieved by the fact that a connecting element without sets of wheels can be coupled between two modules arranged next to one another. This measure has the advantage that as a result of the connecting elements the loading platform between the modules can be at a lower level than that of the loading platform of the modules themselves. As a result, it is possible for large, for example round objects, to rest partly between the two modules, at a lower level. The total height of the transport vehicle and the load together is consequently less than the sum of the height of the load and the height of the transport vehicle. Placing the connecting elements between the two modules widens the track width, so that the stability of the vehicle is increased. This measure allows objects which cannot be transported in a stable manner on the transport vehicle of standard width to be transported on this transport vehicle. Moreover, the widened transport vehicle can be driven at a relatively high speed without threatening its stability.

Furthermore, it is desirable for numerous applications to widen the loading platform without placing a third module between two modules. This is achieved by the fact that the connecting element between two modules has a loading platform at the level of the loading platforms of the two modules. This means in the first place that the transport vehicle for large, heavy loads can in principle be given any desired width and the width of the vehicle finally obtained does not remain limited to the sum of a number of times the module width. Moreover, this has the advantage that the loading platform, and hence the track width, can be widened using a relatively inexpensive component.

Another drawback of the transport vehicles for large, heavy loads according to the prior art is that the power pack is attached to the transport vehicle in the longitudinal direction. This means that the power pack increases the total length of the transport vehicle without the length of the loading platform increasing. The total length of the transport vehicle including the power pack may impede the freedom of movement of the transport vehicle. If there is only just sufficient room available to be able to maneuver a transport vehicle without power pack, the transport vehicle with the power pack attached can no longer be maneuvered. Therefore, the effectiveness of the transport vehicle according to the present invention is optimized further if the power pack, if desired, were no longer to be coupled to the transport vehicle in the longitudinal direction. For this reason, in a preferred embodiment of the present invention the power pack is accommodated in the connecting element which is positioned between two modules and which has a loading platform at the level of the loading platforms of the two modules. Placing the power pack between two modules has the advantage, in addition to the abovementioned stability advantages resulting from a greater track width, that the total length of the transport vehicle with the power pack attached decreases, since the power pack is added not in the longitudinal direction but rather in the width direction of the transport vehicle. If the transport vehicle according to the present invention is used at locations where there is not much room for manoeuvre, this is an important plus point.

The structure and operation of the transport vehicle for large, heavy loads according to the present invention is explained with reference to the following figures, in which:

FIG. 1 shows a side view of the module for a transport vehicle for large, heavy loads according to the present invention, FIG. 2 is a front view of the transport vehicle for large, heavy loads according to the present invention with the power pack placed between the two modules, FIG. 3 shows a cross-section of the transport vehicle for large, heavy loads according to the present invention, with a connecting element, on which an object is situated, between the two modules.

FIG. 1 shows a side view of the module for a transport vehicle for large, heavy loads (indicated overall in the figure by the numeral 1) according to the present invention. The module comprises a plate 2 which is positioned vertically in the longitudinal direction of the module 1. A loading platform 3 is mounted on the plate 2. The loading platform 3 is at right angles to the plate 2. Support arms 9 are positioned between the plate 2 and the loading platform 3. The position of the support arms 9 can also be seen clearly in FIG. 3. Rotatable wheel legs 4 are placed on the underside of the loading platform 3. Pivotable wheel arms 5 are mounted at the end of these wheel legs 4. Axles 6 are placed at the end of these wheel arms 5, with a wheel 7 on each end of the axle. The position of the wheel legs 4, the wheel arms 5, the axles 6 and the wheels 7 with respect to the loading platform 3 can be seen clearly in FIGS. 2 and 3. In order to be able to adjust the height of the loading platform 3 with respect to the ground, hydraulic cylinders 8 are placed between the wheel legs 4 and the wheel arms 5. Coupling means 10 are arranged at the end of the loading platform, so that the loading platform of one module projects partially into the loading platform of the next module when coupling the successive modules together.

FIG. 2 shows the front view of the transport vehicle for large, heavy loads according to the present invention. The figure shows the situation in which a power pack 12 is placed between two modules, A and B. Both the module A and the module B comprise fastening points 11 for fastening the power pack 12. As a result of placing the power pack 12 between the modules A and B, the track width is greater than if the modules A and B are placed directly against one another. The top side of the power pack 12, together with the topside of the loading platform 3 of a module A and the top side of the loading platform 3 of the module B, forms a wide, flat loading platform.

FIG. 3 shows a cross-section of the module according to the present invention, a connecting element 13 being placed between the modules A and B. The connecting element 13 is fastened to the plate 2 of both the module A and the module B. The figure shows that the track width of the transport vehicle in which a connecting element 13 is placed between the modules A and B is greater than if the modules A and B were placed directly against one another. The figure shows the situation where a pipe 14 has been placed on the connecting element 13. It is clear that part of the volume of the pipe 14 sinks between the two modules. The bottom part of the pipe 14 hence lies beneath the level of the loading platforms 3 of the modules A and B. The total height of the vehicle with the load on it is hence less than the sum of the height of the vehicle and the load.

FIG. 1 shows a module for a transport vehicle for large, heavy loads 1 with six rows of wheels 7 beneath it. Of the six axles shown, two are freewheel axles 15, two are braked axles 16 and two are driven axles 17. The freewheel axle 15 is illustrated in cross-section in FIG. 2. The braked axle 16 and the driven axle 17 are illustrated in cross-section in FIG. 3. It is clear that the module can also be constructed with, for example, four, eight or ten rows or wheels. It is also possible to vary the sequence and number of freewheel, braked and driven axles. It is also clear that numerous other variations which fall within the scope of the present invention are also possible.

We claim:

1. A transport vehicle for large, heavy loads, comprising plural modules adapted to be coupled one behind the other, each of said modules having a loading platform and sets of wheels for conveying the transport vehicle, wherein the modules have a width of approximately 1215 mm and are also adapted to be coupled next to one another.

2. The vehicle according to claim 1, wherein each of the modules further comprises fastening points on at least one side to couple two of said modules next to one another.

3. The vehicle according to claim 2, further comprising a connecting element without sets of wheels coupled between two of said modules arranged next to one another.

4. The vehicle according to claim 3, wherein the connecting element has a loading platform at a level of the loading platforms of the two said modules.

5. The vehicle according to claim 3, wherein said connecting element comprises a power generator for propelling the vehicle.

6. The vehicle according to claim 3, wherein said connecting element comprises a loading platform at a level offset from a level of the loading platforms of the two said modules.

* * * * *